(12) United States Patent
Wu et al.

(10) Patent No.: US 7,524,362 B2
(45) Date of Patent: Apr. 28, 2009

(54) MODULAR FILTER ASSEMBLY

(75) Inventors: Guolian Wu, St. Joseph, MI (US);
Andrew D. Litch, St. Joseph, MI (US);
Alexander J. Karp, West Lafayette, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 469 days.

(21) Appl. No.: 11/074,909

(22) Filed: Mar. 8, 2005

(65) Prior Publication Data
US 2006/0201120 A1 Sep. 14, 2006

(51) Int. Cl.
*B01D 46/00* (2006.01)

(52) U.S. Cl. .................. 96/15; 96/26; 96/222; 96/417; 96/420; 96/421; 55/481; 55/495; 55/504; 55/506; 55/DIG. 31

(58) Field of Classification Search .................. 55/506, 55/493, 497, 504, 511, 517, DIG. 31, DIG. 35, 55/481, 495; 96/222, 417, 420, 421, 26, 96/15; 34/96; 422/123
See application file for complete search history.

(56) References Cited

U.S. PATENT DOCUMENTS

| | | | | |
|---|---|---|---|---|
| 4,420,315 A * | 12/1983 | Kershaw | ...................... | 55/501 |
| 5,399,180 A * | 3/1995 | Kopp | ........................... | 55/493 |
| 5,547,636 A * | 8/1996 | Vick et al. | .................. | 422/124 |
| 5,817,168 A * | 10/1998 | Wheless | ...................... | 96/222 |
| 6,264,713 B1 * | 7/2001 | Lewis, II | ...................... | 55/481 |
| 6,485,538 B1 * | 11/2002 | Toyoshima | .................. | 55/490 |
| 6,716,267 B2 * | 4/2004 | Lawlor, Sr. | .................. | 55/506 |
| 6,723,150 B2 * | 4/2004 | Parker | ......................... | 55/521 |
| 6,749,654 B2 * | 6/2004 | Hilliard | ..................... | 55/385.1 |
| 6,749,672 B2 * | 6/2004 | Lynn | .......................... | 96/222 |
| 6,793,703 B1 * | 9/2004 | Sledge et al. | ................ | 55/495 |
| 7,037,354 B1 * | 5/2006 | Dimicelli | ..................... | 55/497 |
| 7,261,757 B2 * | 8/2007 | Duffy | .......................... | 55/502 |
| 7,323,028 B2 * | 1/2008 | Simmons | ..................... | 55/495 |
| 7,364,602 B2 * | 4/2008 | Wu et al. | ...................... | 55/493 |
| 2002/0157540 A1 * | 10/2002 | Lynn | ........................... | 96/222 |
| 2006/0272304 A1 * | 12/2006 | Louis Schupp | .............. | 55/501 |

* cited by examiner

*Primary Examiner*—Duane S Smith
*Assistant Examiner*—Minh-Chau T Pham
(74) *Attorney, Agent, or Firm*—John Morrison; Michael D. Lafrenz

(57) ABSTRACT

An air treatment assembly for treating air passing through an air duct comprises a frame defining an interior space and having an inlet opening providing access to the interior space, an air treatment medium sized to be inserted into the interior space through the inlet opening, and a keyed connection between the frame and the air treatment medium to control the engagement of the air treatment medium with the frame. The air treatment assembly also comprises a frame defining an interior space, an air treatment medium sized to be received within the interior space, and an air quality module integrated with the frame.

22 Claims, 15 Drawing Sheets

MODULAR FILTER ASSEMBLY

BACKGROUND OF THE INVENTION

1. Field of the Invention

The invention relates generally to filters for filtering fluids, such as air. In one aspect, the invention relates to a filter assembly comprising a modular frame supporting a uniquely communicating filter medium. In another aspect, the invention relates to a filter assembly comprising a frame supporting a filter medium and a fluid quality module.

2. Description of the Related Art

Conventional forced air furnaces or central air conditioners (generically referred to as heating, ventilating, and air conditioning, or HVAC, systems) comprise a return air duct to direct air into a central unit for conditioning by either heating or cooling, and an outlet duct for distribution of the conditioned air from the central unit throughout the building. The return air duct typically has a filter disposed therein for removing dust and other particulate matter from the incoming air. As air passes through the filter, the matter is removed to prevent distribution through the home and to avoid contamination of the central unit.

Several types of filters exist for removal of matter from the air. The most common variety is a standard, rectangular panel replaceable filter, which is composed of a random arrangement of fibers, such as fiberglass, supported within an open cardboard frame. They filter the air by trapping particles within the randomly oriented fibers. Although these filters are able to capture large particles, they do little to remove smaller particles from the air. These filters primarily protect the central unit and minimize the amount of dust on the heating or cooling equipment. Their principal advantage lies in their low cost and low pressure drop.

Other filters include replaceable and reusable pleated filters, high efficiency pleated filters, high efficiency particulate air (HEPA) filters, and washable fiberglass filters. Pleated filters have a filter element that is pleated or folded to provide a large surface area for collecting particles. High efficiency pleated filters are reusable or disposable, and are also electrostatically charged to capture small particulate matter less than one micron in size. HEPA filters are efficient at removing submicron particles and comprise a core fiber that is folded back and forth over corrugated separators. The fiber is composed of very fine sub-micron glass fibers in a matrix of larger fibers. Washable fiberglass filters are similar to the conventional panel filters but can be washed and, therefore, reused.

Each type of filter has advantages and disadvantages. Pleated filters are effective at removing small particles, but they must be replaced more frequently than panel filters to avoid airflow restriction. HEPA filters efficiently remove submicron particles, but they are relatively expensive and create a higher pressure drop. Washable fiberglass filters cannot be completely cleaned to their original state and, therefore, can restrict airflow.

In many cases, the selection of an air filter must be carefully determined based upon factors such as specific health requirements of the building inhabitants, the air flow characteristics of the particular HVAC system utilized, cost, maintenance considerations, and the like. These and other factors may dictate that a specific filter, or a small selection of filters, be used exclusively, and be correctly selected and installed. Other than size differentiation, conventional filter configurations do not prevent the installation of an inappropriate filter in the HVAC system.

There are also situations where it is desirable to ensure the proper installation of the air filter or another air treatment device. For example, in Applicant's copending application Ser. No. 11/025,496, which is incorporated by reference, an air treatment device is disclosed that is sized to be inserted into a standard filter opening in a duct of a household HVAC system. One embodiment of the air treatment device is an electrostatic precipitator, which comprising an ionizing grid and a collection grid. It is preferred for best performance that the electrostatic precipitator be inserted in the duct such that the ionizing grid is upstream of the collection grid. It is desirable to have an air filter or an air treatment device who's installation is ensured.

SUMMARY OF THE INVENTION

An air treatment assembly for treating air passing through an air duct comprises a frame defining an interior space and having an inlet opening providing access to the interior space, an air treatment medium sized to be inserted into the interior space through the inlet opening, and a keyed connection between the frame and the air treatment medium to control the engagement of the air treatment medium with the frame.

The keyed connection can be provided between the insert opening and the air treatment medium to control the insert orientation of the air treatment medium into the insert opening. The keyed connection can comprise a key on one of the air treatment medium and the insert opening and a keyway for receiving the key on the other of the air treatment medium and the insert opening. Each of the air treatment medium and the insert opening can have an irregular cross-section to form the key and key way. The irregular cross-sections can be complementary.

The keyed connection can comprise a key on one of the air treatment medium and the frame and a keyway for receiving the key on the other of the air treatment medium and the frame. The frame can be sized to be slidably inserted into a standardized opening in the air duct.

The air treatment medium can have opposing faces and the keyed connection can control the orientation of the opposing faces relative to the direction of air flow in the duct. The air treatment medium can comprise at least one of: an air filter, an ionizer, an electrostatic precipitator, and an air quality module removably mounted to the frame. The air quality module can be removably mounted to the frame independent of the air treatment medium.

The keyed connection can be provided between the insert opening and the air treatment medium to control the size of the air treatment medium relative to the insert opening.

In another embodiment, an air treatment assembly comprises a frame defining an interior space, an air treatment medium sized to be received within the interior space, and an air quality module integrated with the frame. The air quality module can be removably mounted to the frame, and can comprise an air scent release module, a temperature sensing module, a humidity sensing module, an air pressure transducer, or a power distribution module.

The frame can have an inlet opening providing access to the interior space and the air treatment medium can be sized to be inserted through the inlet opening. A keyed connection between the frame and the air treatment medium can control the engagement of the air treatment medium with the frame. The frame can be sized to be slidably inserted into a standardized opening in the air duct.

DESCRIPTION OF AN EMBODIMENT OF THE INVENTION

The invention is described herein with respect to an embodiment comprising an air filter assembly having a frame adapted for selectively supporting an air treatment medium and/or an air quality module. As used herein, the term "air treatment medium" is not limited to a conventional air filter medium, such as fibrous or corrugated filters, but should be understood to include conventional filters, electrostatic precipitation devices, ionizers, humidifiers, and other air filtering and treatment devices.

Figure 1:
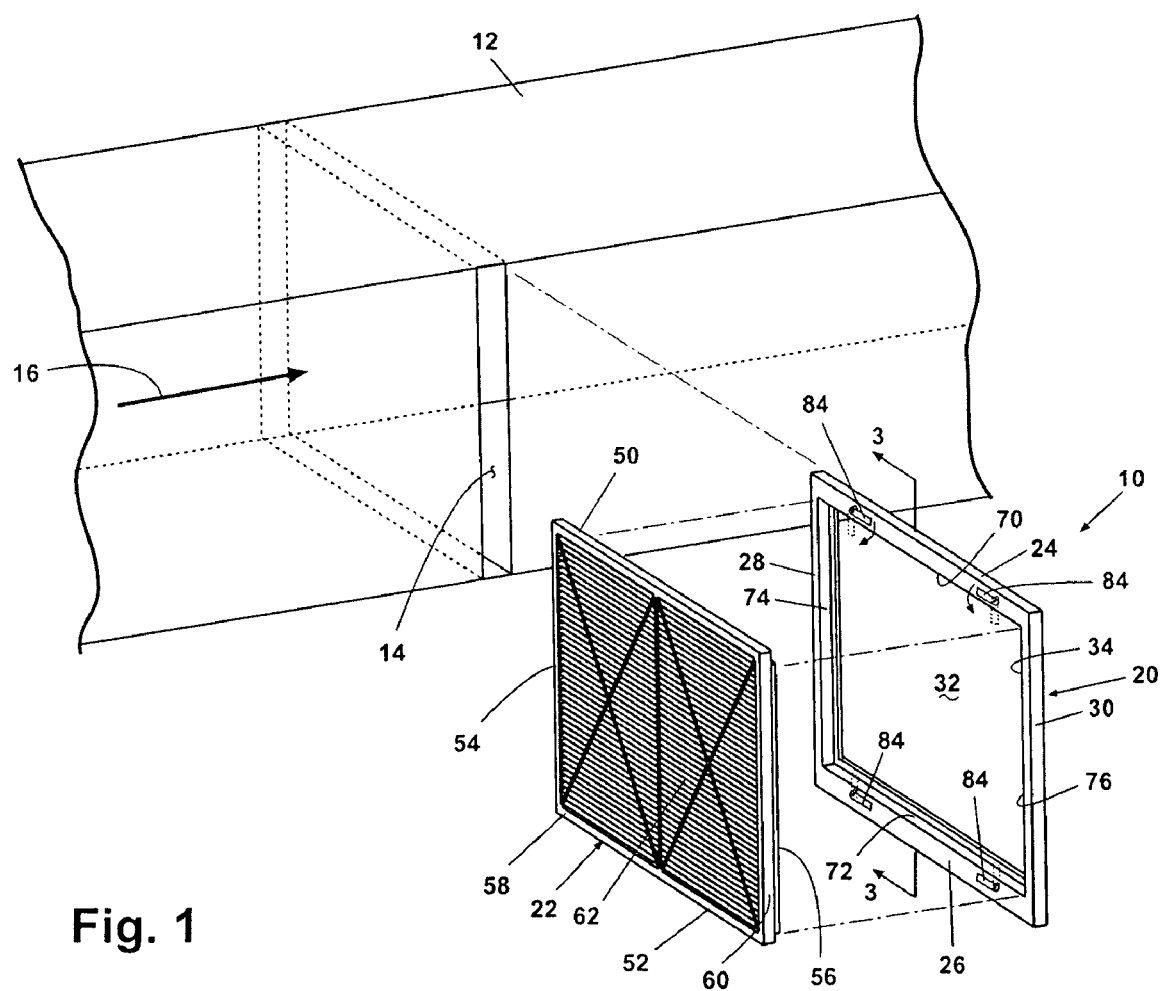
FIG. 1 is a partially exploded perspective view of an air treatment assembly according to the invention for installation in an HVAC air duct comprising a frame having a keyway supporting an air treatment medium having a key for joining the frame and the air treatment medium in a first embodiment of a keyed connection.
Figure 2:
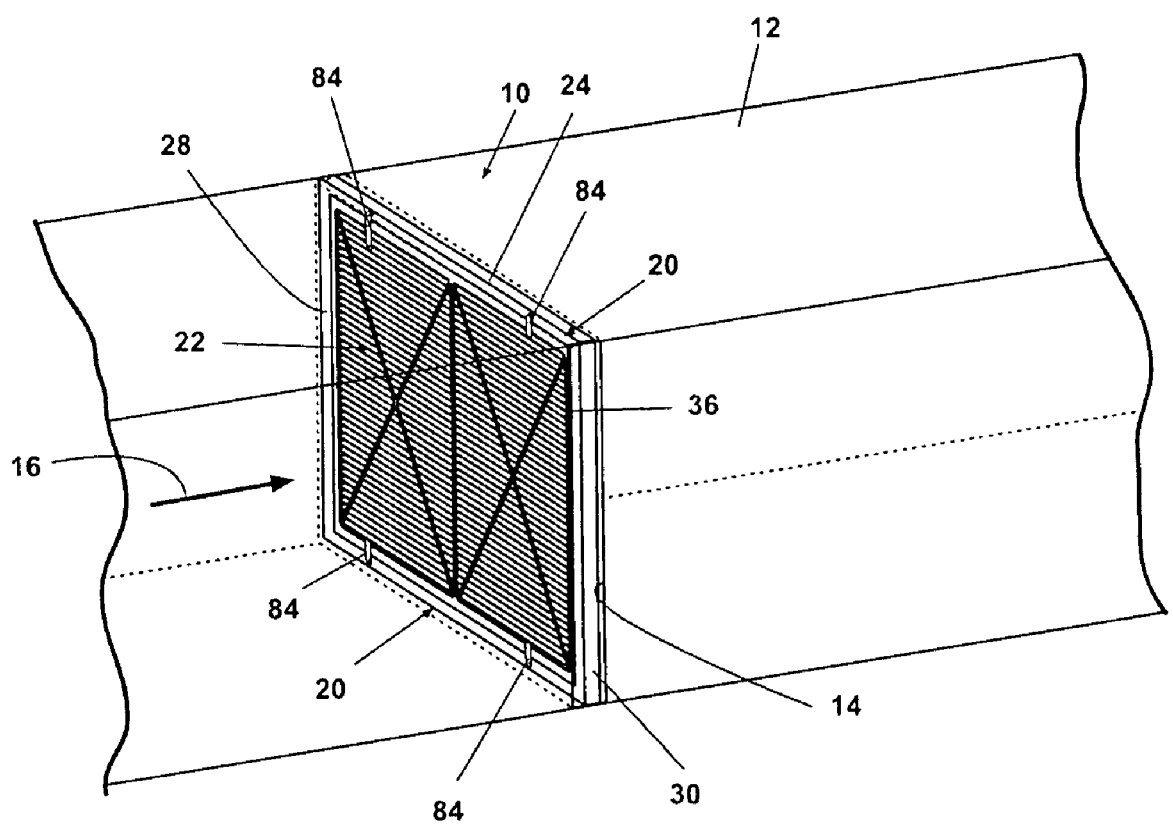
FIG. 2 is a partial cutaway view of the assembled frame and air treatment medium installed in the HVAC air duct.

Referring now to the figures, and in particular to FIGS. 1 and 2, an air treatment assembly 10 according to an embodiment of the invention is shown with a generally well-known HVAC air duct 12 into which the air treatment assembly 10 is to be installed. The air duct 12 is provided with an opening 14 adapted for this purpose in a well-known manner in order that the air treatment assembly 10 can intercept a flow of air, identified by the air flow vector 16, through the air duct 12.

The air treatment assembly 10 comprises a frame 20 and an air treatment medium 22 in cooperative registry, as hereinafter described. The frame 20 is a rectilinear body comprising a top rail 24 and a bottom rail 26 in parallel, spaced-apart juxtaposition, joined by a pair of stiles 28, 30 in parallel, spaced-apart juxtaposition, to define a rectilinear interior space 32 accessible through an opening 34. The frame 20 is adapted for slidable registry with the opening 14 in the air duct 12, and has exterior dimensions complementary to the interior dimensions of the air duct 12. Preferably, the frame 20 is fabricated of a rigid, high-strength material, such as steel, aluminum, or high-strength plastic.

The air treatment medium 22 is a generally continuous, rectilinear body terminating in a top edge 50 and a bottom edge 52 in parallel, spaced-apart juxtaposition, and a pair of side edges 54, 56 in parallel, spaced-apart juxtaposition to define a rectilinear perimeter 58. The air treatment medium 22 is adapted for slidable registry with the frame 20. The registry between the air treatment medium 22 and the frame 20 he is facilitated by a keyed connection 36 comprising a key 38 and a keyway 40.

FIG. 2 illustrates the assembled air treatment assembly 10 inserted into the air duct 12. The air treatment assembly 10 is oriented so that the air flow, represented by the air flow vector 16, urges the air treatment medium 22 against the frame 20, with the keyed connection 36 holding the air treatment medium 22 against the frame 20.

Figure 3:
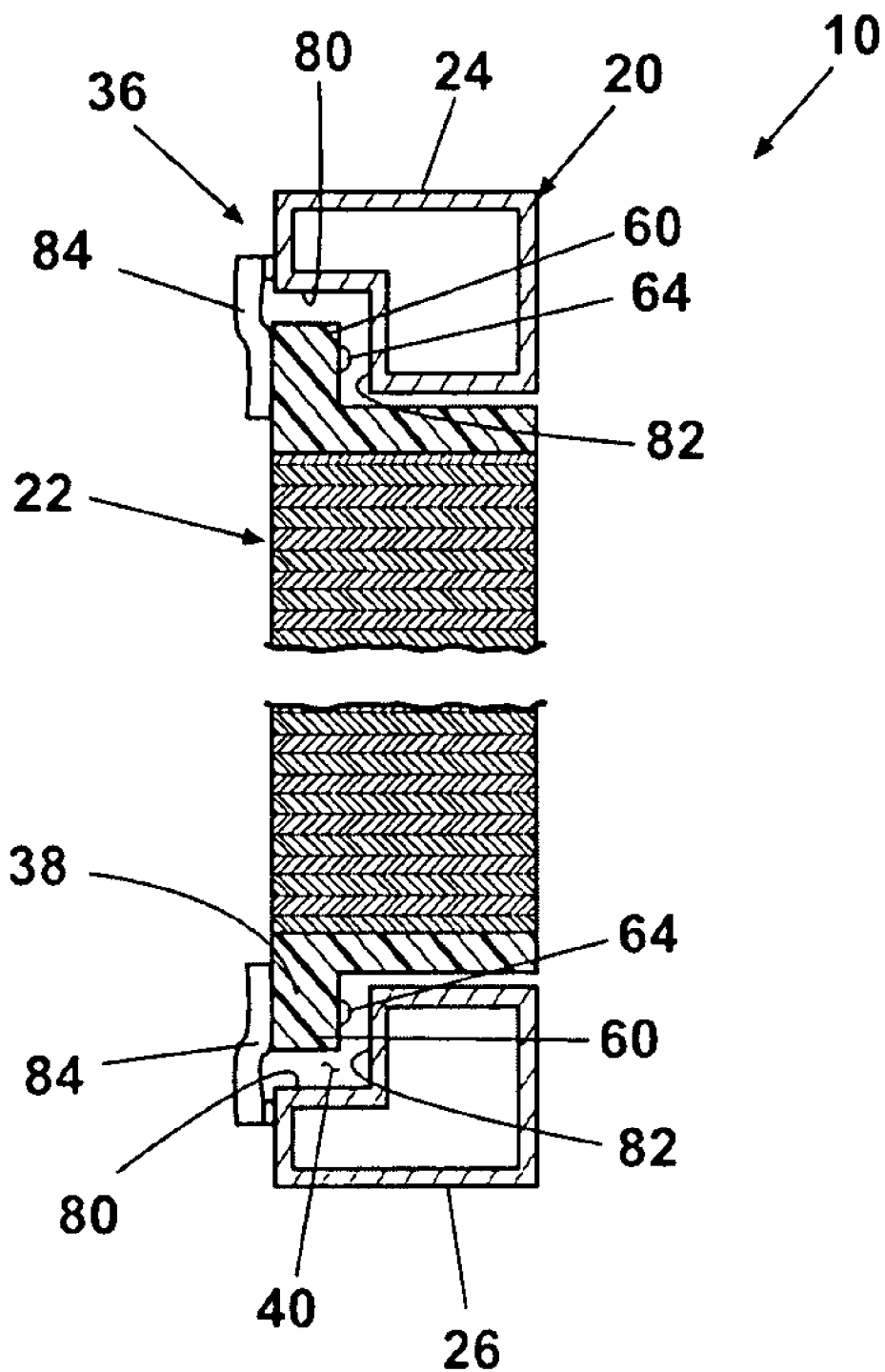
FIG. 3 is a sectional view of the assembled frame and air treatment medium illustrated in FIG. 1 taken along view line 2-2.

FIG. 3 best illustrates a first embodiment of the keyed connection 36 in which the top rail 24 as an inwardly-directed top rail edge 70, and the bottom rail 26 has an inwardly-directed bottom rail edge 72. The stile 28 has an inwardly-directed stile edge 74, and the stile 30 has an inwardly-directed stile edge 76. The edges 70-76 define a perimeter 78 having a perimeter rabbet 80 extending therealong. The perimeter rabbet 80 defines a flange seat 82.

The air treatment medium 22 terminates along the perimeter 58 in a perimeter flange 60 having dimensions complementary to the perimeter rabbet 80 and which defines a rectilinear central portion 62 having perimetric dimensions complementary to the dimensions of the interior space 32 of the frame 20. The air treatment medium 22 is brought into slidable registry with the frame 20 by inserting the central portion 62 into the interior space 32 so that the perimeter flange 60 is in registry with the flange seat 82. An array of suitable, well-known retaining devices 84, such as latches, levers, swing arms, tabs, screws, and the like, are attached to the frame 20 to removably secure the air treatment medium 22 to the frame 20.

The perimeter flange 60 and flange seat 82 comprise the keyed connection 36 in which the perimeter flange 60 comprises the key 38 and the flange seat 82 comprises the keyway 40. The perimeter flange 60 can also be provided with a flange gasket 64 for registry with the flange seat 82 to minimize the flow of air between the perimeter flange 60 and the flange seat 82.

The air treatment medium 22 is installed to the frame 20 by bringing the key 38 (i.e. the perimeter flange 60) into cooperative registry with the keyway 40 (i.e. the flange seat 82), and securing the air treatment medium 22 to the frame 20 with the retaining devices 84. The keyed connection 36 ensures that the appropriate air treatment medium 22 is installed to the frame 20. The air treatment assembly 10 is then installed into the duct 12 through the opening 14.

Figure 4:
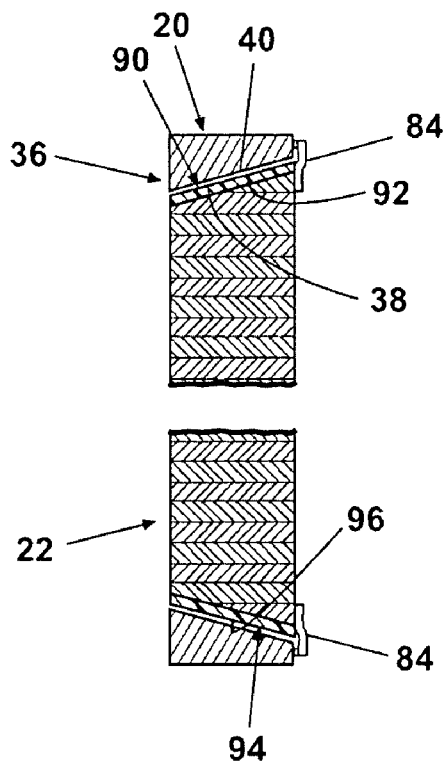
FIG. 4 is a sectional view of a second embodiment of the keyed connection joining the frame and air treatment medium taken along view line 2-2.

FIG. 4 illustrates a second embodiment of the keyed connection 36 in which the inner frame perimeter 90 has a perimeter bevel 92 comprising the key 38, and the filter medium outer perimeter 94 has a perimeter bevel 96 comprising the keyway 40 complementary to the perimeter bevel 92. The bevels 92, 96 are adapted so that the air treatment medium 22 can be inserted into the interior space 32 to bring the bevels 92, 96 into registry and prevent further insertion of the air treatment medium 22 into the frame 20. The air treatment medium 22 can be removably retained in the frame 20 by an array of suitable retaining devices 84, as previously described.

Figure 5:
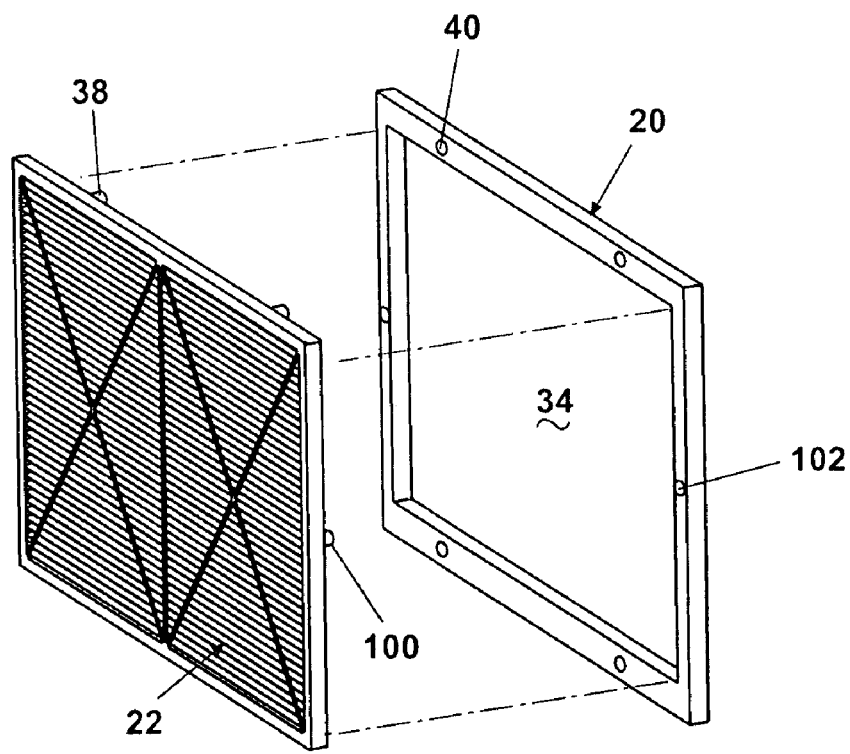
FIG. 5 is an exploded view of a third embodiment of the keyed connection joining the frame and air treatment medium.

FIG. 5 illustrates a third embodiment of the keyed connection 36 in which the frame 20 is provided with an array of filter posts 100 and the air treatment medium 22 is provided with an array of support apertures 102 complementary to the filter posts 100. Preferably, the filter posts 100 extend orthogonally away from the plane of the frame 20 along an outer edge thereof, and the support apertures 102 extend through the air treatment medium 22 along an outer edge thereof, for slidable insertion of the filter posts 100 into the support apertures 102. The air treatment medium 22 can be removably retained in the frame 20 by an array of suitable retaining devices 84, as previously described, or by adapting the filter posts 100 and the support apertures 102 for an interference fit of the filter posts 100 with the support apertures 102.

Figure 6A:
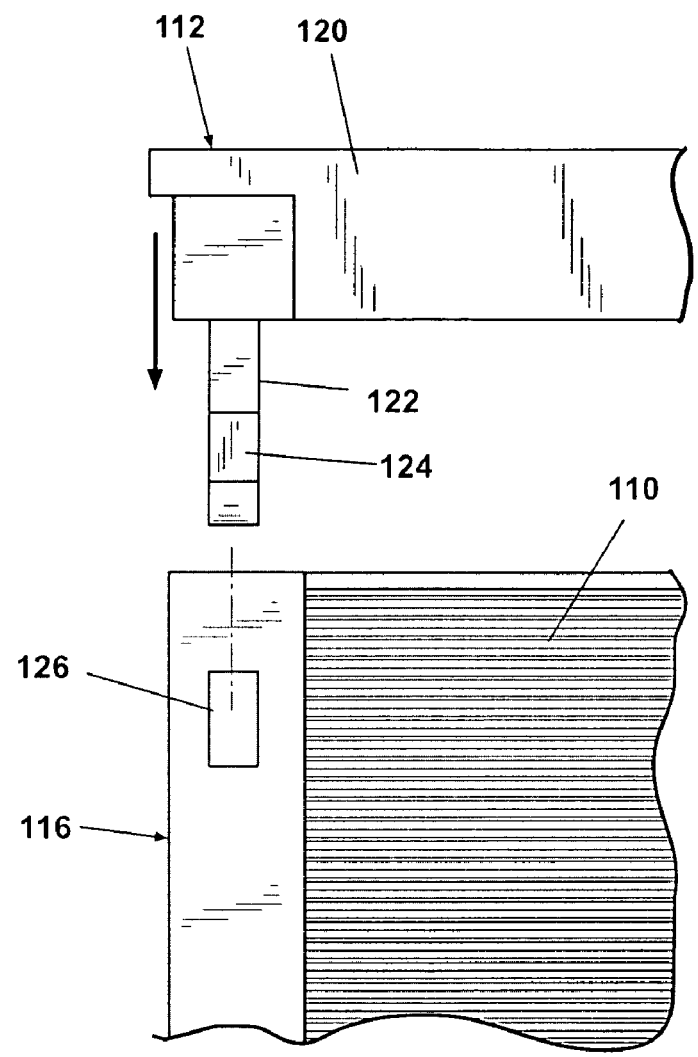
FIG. 6A is an exploded view of an alternate embodiment of the keyed connection comprising upper and lower frame rails and an air treatment medium having stiles adapted for keyed connection with the rails.

FIG. 6A illustrates an embodiment of the keyed connection 36 comprising an air treatment medium 110 pre-configured with frame elements. The pre-configured frame elements comprise a pair of stiles 116, 118 extending along opposed edges of the air treatment medium 110 and fixedly attached thereto. The stiles 116, 118 are preferably hollow with a rectilinear cross-section, and provided with a rectilinear opening 126 forming a keyway 40 laterally therethrough near the ends thereof.

Figure 6B:
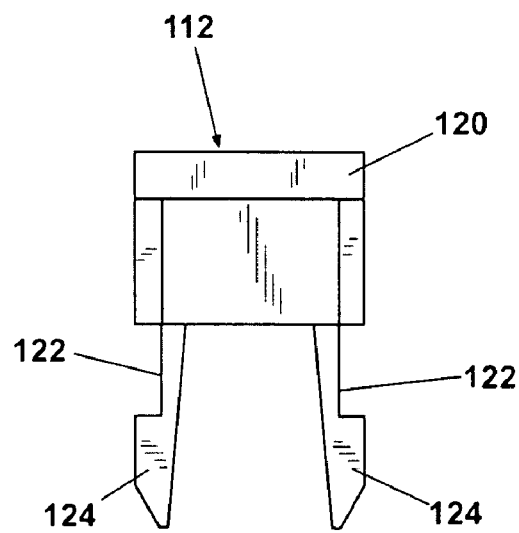
FIG. 6B is an end elevation view of the rail illustrated in FIG. 6A.

A top cap 112 comprising a rectilinear support beam 120 adapted to extend over and between the stiles 116, 118. Referring also to FIG. 6B, at each end of the support beam 120 is at least one finger 122 orthogonal to the longitudinal axis of the support beam 120 and having a hook extension 124 forming a key 38 extending laterally outwardly therefrom. The cap 112 is adapted so that the fingers 122 can be inserted into the stiles 116, 118 with the hook extension 124 received in the opening 126 to retain the caps 112, 114 along the upper and lower edges of the air treatment medium 110.

The opening 14 in the air duct 12 can be adapted so that only a preselected top cap 112 can be inserted into the opening 14. The fingers 122 and openings 126 can also be adapted so that only a preselected air treatment medium 110 can be keyed to the cap 112, 114. Thus, installation of the air treatment medium 110 into the air duct 12 can be controlled by limiting the insertability of the cap 112 into the opening 14.

The fingers 122 can be of different lengths and the openings 126 can be at different locations to effect a one-way mounting of the top cap 112 to the air treatment medium 110. A bottom cap, similar to the top cap 112, can be mounted to the lower edge of the filter media in the same or similar way as the top cap 112. The bottom cap could be configured the same as the top cap or have a different shape to enhance the keyed connection.

Figure 7A:
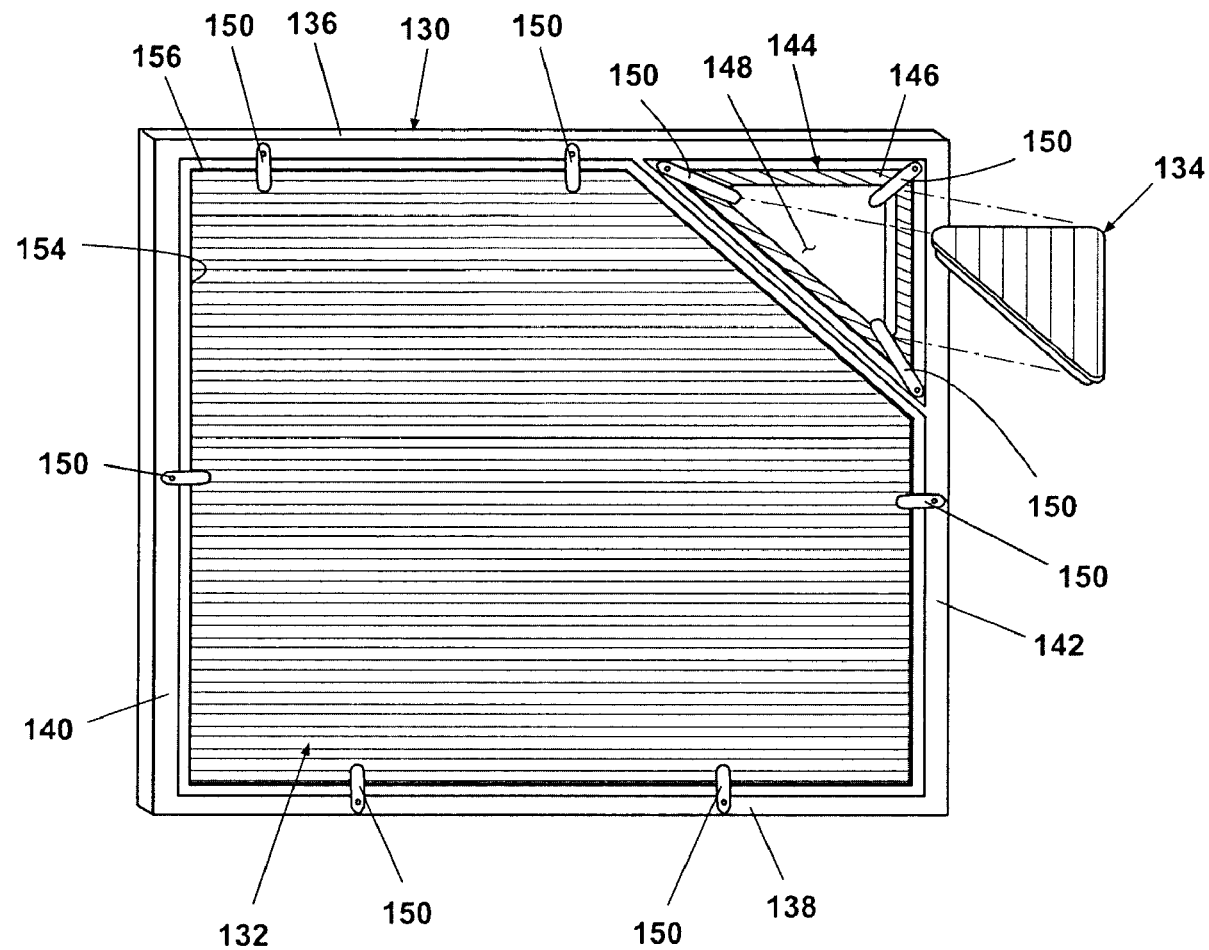
FIG. 7A is a partially exploded view of an alternate embodiment of a modular air treatment assembly comprising a frame, an air treatment medium, and an air quality module having a keyed connection with the frame.
Figure 7B:
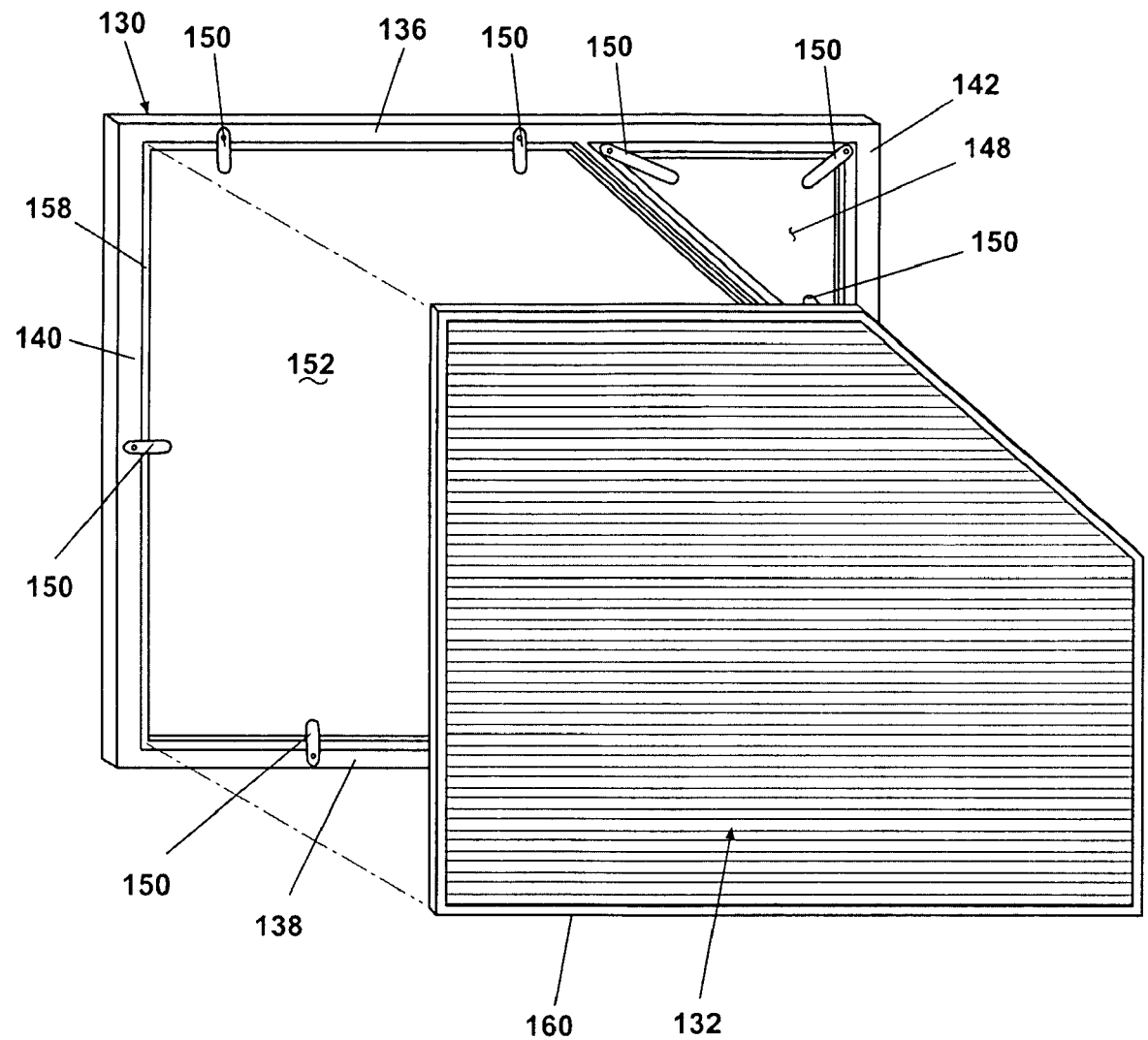
FIG. 7B is a front elevation view of the air treatment medium illustrated in FIG. 7A.

FIGS. 7A and B illustrate an embodiment of a frame 130 and an air treatment medium 132 adapted to accommodate a separate replaceable air quality module 134. The frame comprises a top rail 136 and a bottom rail 138 in parallel, spaced-apart juxtaposition, joined by a pair of stiles 140, 142 in parallel, spaced-apart juxtaposition to define an interior space 152 accessible through an opening 154 therethrough. A corner of the frame 130 is adapted with a module receptacle 144 comprising a support flange 146 defining an opening 148 configured for complementary registry with the air quality module 134.

The air treatment medium 132 is adapted with a key 38, and the frame 130 is adapted with a keyway 140, to form a keyed connection 136 for cooperative registry of the air treatment medium 132 with the frame 130 as previously described. A retaining mechanism 150 is used to removably attach the air treatment medium 132 to the frame 130 as previously described.

The air quality module 134 is selectively replaceable in the module receptacle 144, and can comprise selected functionalities such as an air scent release module, a temperature sensing module, a humidity sensing module, an air pressure transducer, or a power distribution module. The power distribution module can be utilized to provide power to an air treatment medium 132 comprising an electrostatic precipitator, ionizer, or other air treatment device requiring power for operation. The power distribution module can also be utilized to deliver power from a central power source in the HVAC system to remote devices requiring power.

Both the air treatment medium and the air quality module have a keyed connection where the key and keyway are essentially formed by the complementary irregular shapes of the air treatment medium and the air quality module and their corresponding openings in the frame 130. The other previously described keyed connections could also be used in combination with the irregular shapes.

Figure 8:
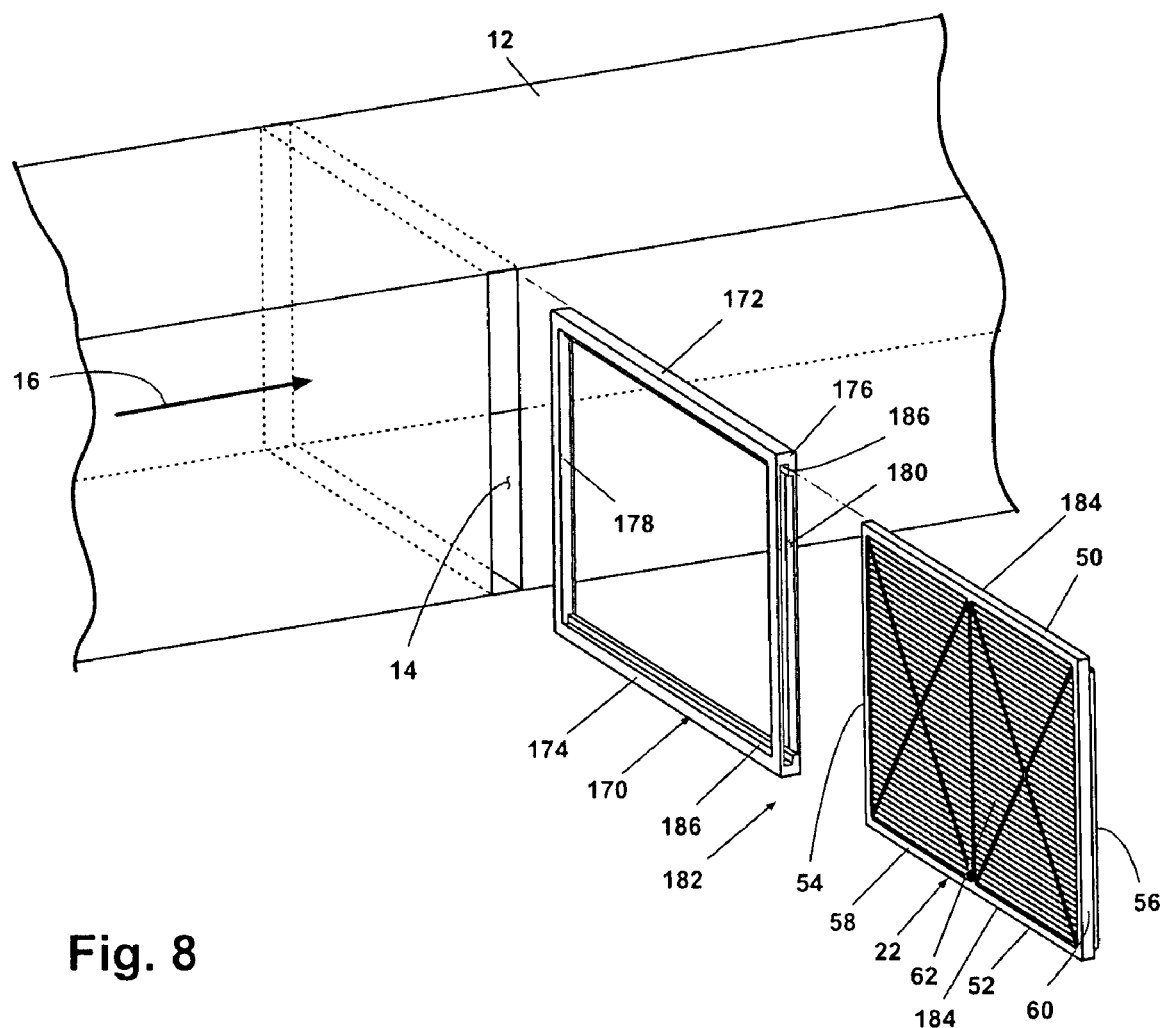
FIG. 8 is an exploded view of an alternate embodiment of an air treatment assembly having a keyed connection for joining the frame and air treatment medium.

An alternate embodiment of the keyed connection 182 joining the frame and the air treatment medium is illustrated in FIG. 8. The frame 170 is a rectilinear body comprising a top rail 172 and a bottom rail 174 in parallel, spaced-apart juxtaposition, joined by a pair of stiles 176, 178 in parallel, spaced-apart juxtaposition, to define a rectilinear interior space 188. One of the stiles 176 is adapted with an opening 180 therethrough in communication with the interior space 188.

The embodiment of FIG. 8 is illustrated with an air treatment medium having the same configuration as the air treatment medium 22, i.e. a rectilinear body having edges 50-56 defining a rectilinear, flange-like perimeter 58 forming a key 184 along at least the top edge 50 and the bottom edge 52. The top rail 172 and the bottom rail 174 of the frame 170, and the opening 180, are adapted with a keyway 186 for slidable receipt of the key 184 when the air treatment medium 22 is slidably inserted into the frame 170. Other keyed connection configurations, such as the keyed connection illustrated in FIG. 3, can be utilized to provide a uniquely complementary registry between the air treatment medium and the frame. With the air treatment medium 22 installed in the frame 170, the air treatment assembly can be installed in the duct 12 through the opening 14.

FIGS. 9-13 illustrate an embodiment of the modular air treatment assembly for use with an expandable air cleaner frame as described and illustrated in pending U.S. patent application Ser. No. 11/025,496, which is incorporated by reference.

Figure 9:
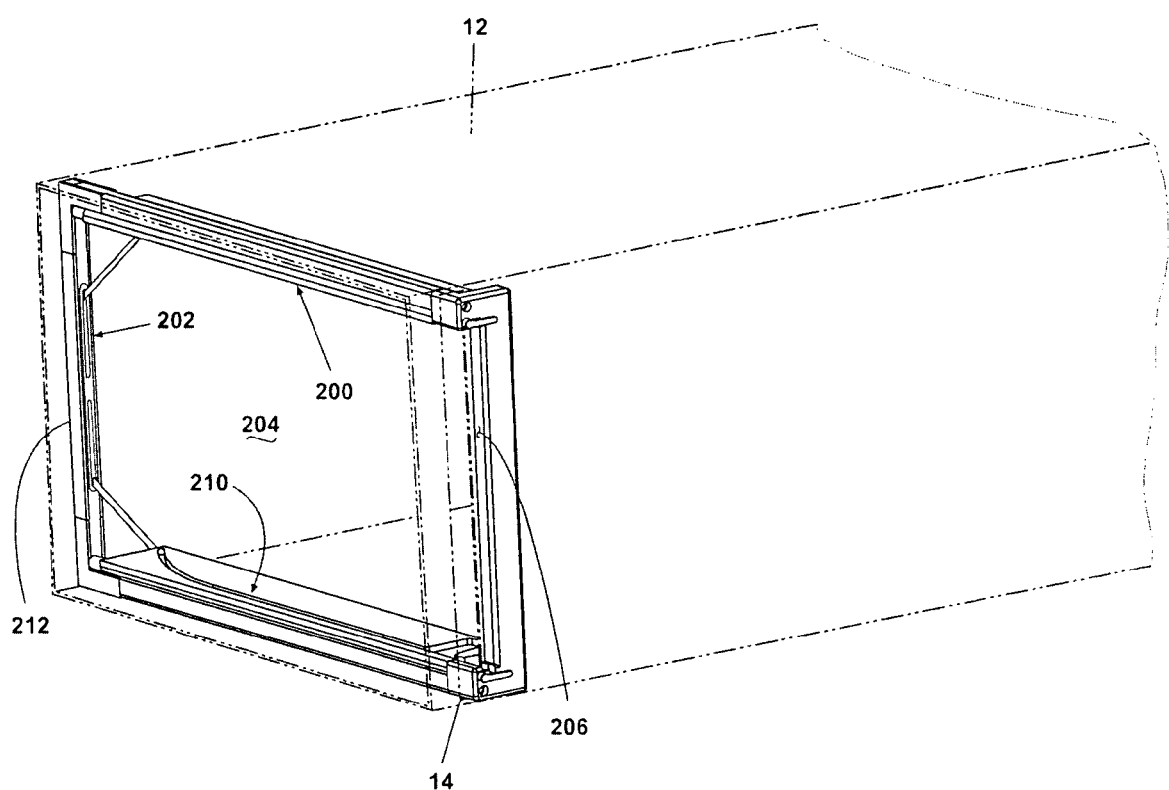
FIG. 9 is a perspective view of an expandable air cleaner frame installed in an HVAC air duct, and adapted for installation of the air treatment assembly illustrated in FIG. 1.
Figure 10:
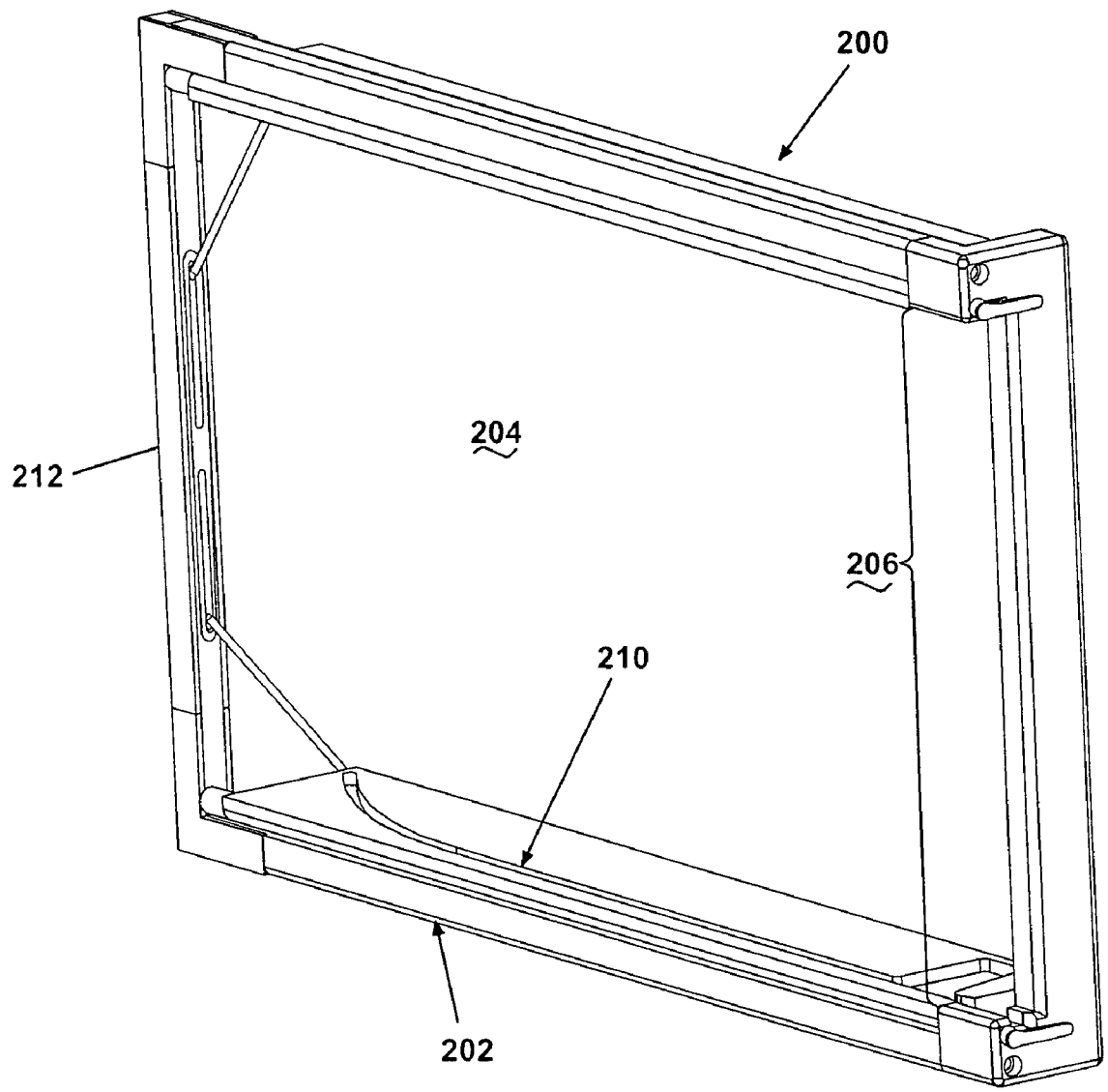
FIG. 10 is a perspective view of the expandable air cleaner frame illustrated in FIG. 9.
Figure 12:
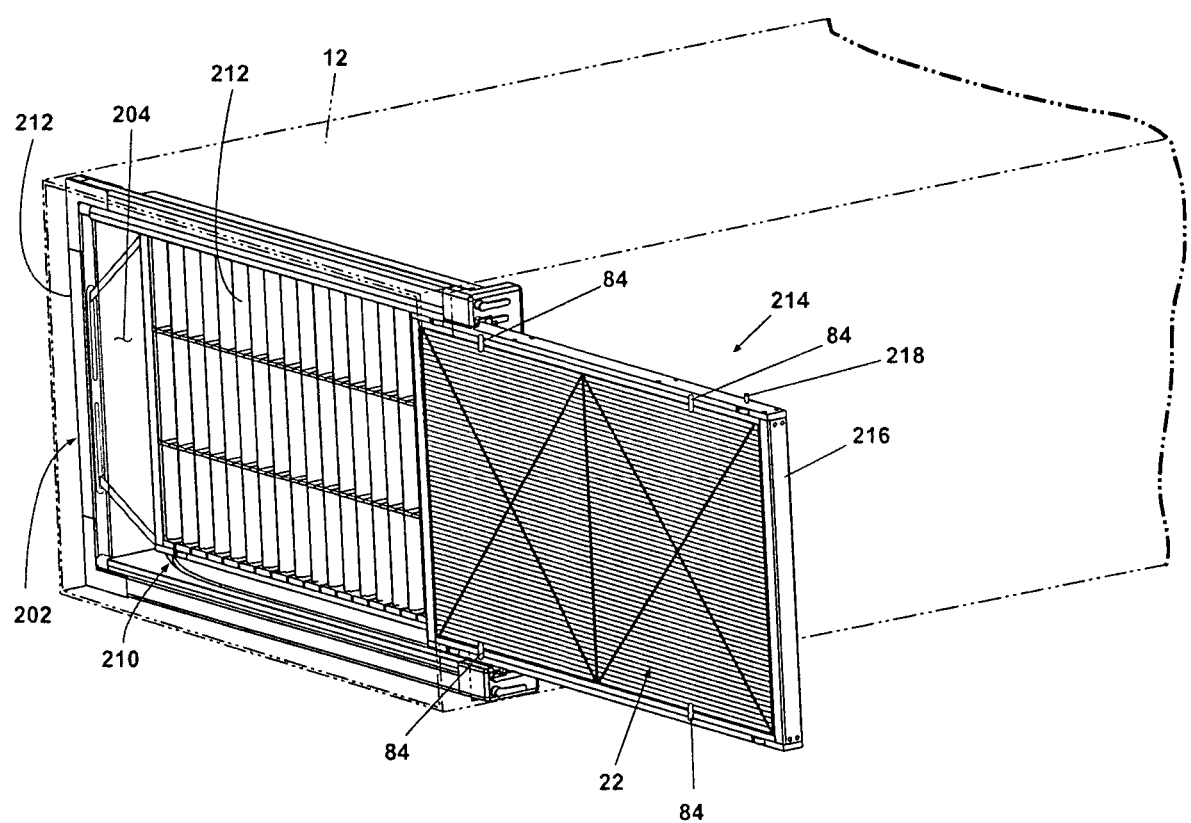
FIG. 12 is a perspective view similar to FIG. 9 illustrating the air treatment assembly partially inserted into the expandable air cleaner frame.

As illustrated in FIGS. 9 and 10, an expandable air cleaner frame 200 comprises a rectilinear peripheral frame 202 defining an open-sided recess 204 with an elongated aperture 206 at a proximal end that functions as an insert opening for insertion of one or more air conditioning elements, such as an air treatment assembly 214 (FIG. 12). The expandable air cleaner frame 200 is adapted with a pair of opposed, curved slot guides 210 extending in parallel planes along the open-sided recess 204 from the aperture 206 toward a distal end 212 of the frame 200. The peripheral frame 202 is sized to be inserted into the air duct 12 through the opening 14.

Figure 11:
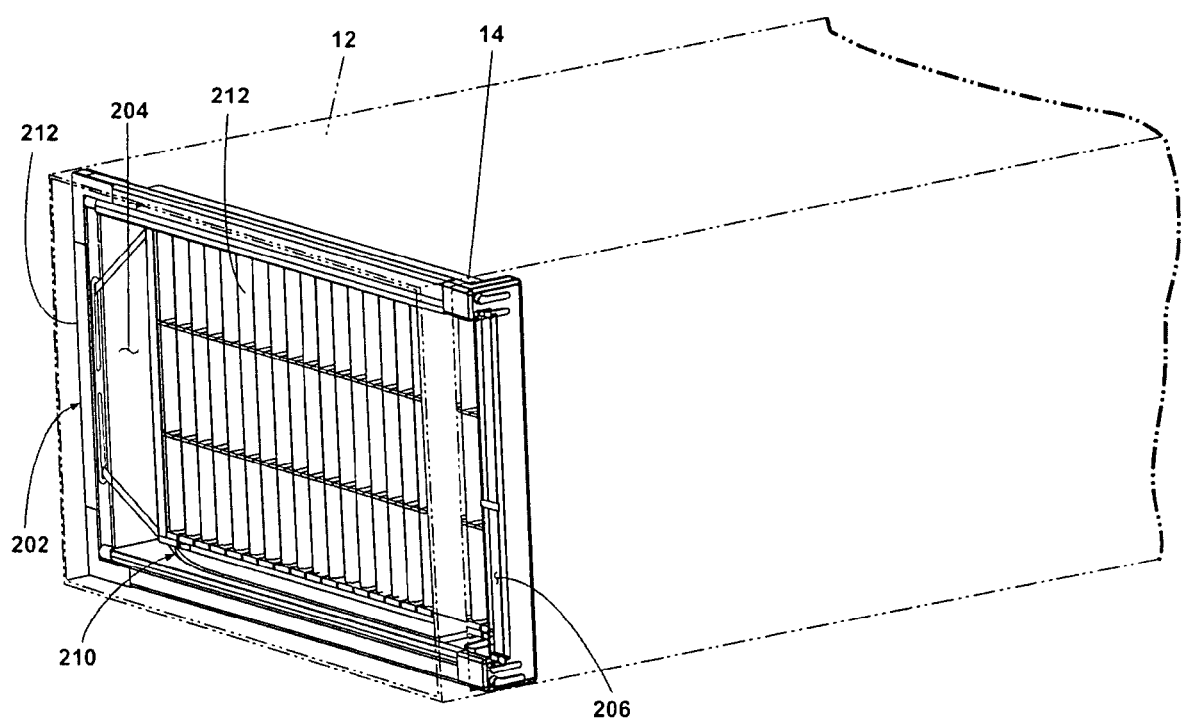
FIG. 11 is a perspective view similar to FIG. 9 illustrating a first filter element fully inserted into the expandable air cleaner frame.

As illustrated in FIG. 11, with the expandable air cleaner frame 200 installed in the air duct 12, one or more air conditioning elements 212 can be inserted into the air cleaner frame 200. FIG. 11 illustrates the expandable air cleaner frame 200 installed in the air duct 12 with an air conditioning element 212, such as an air cooling element, an electrostatic precipitator element, an auxiliary filtering element, and the like, in place.

Figure 13:
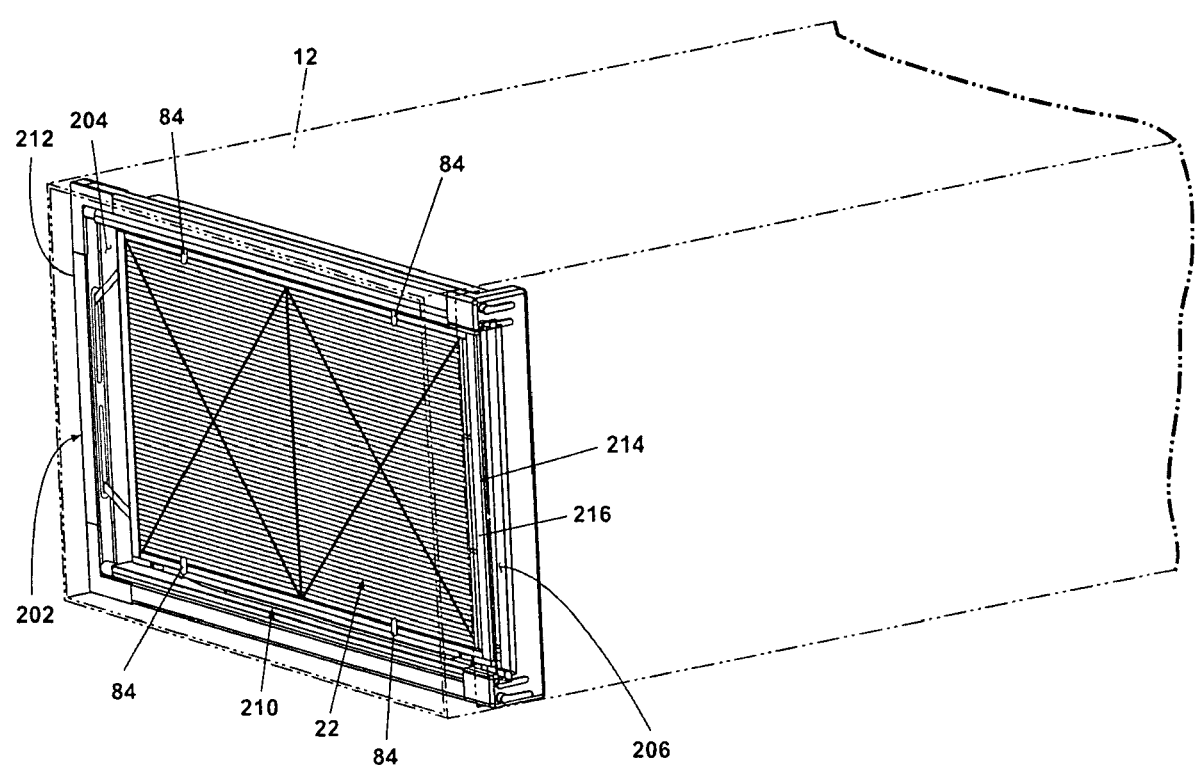
FIG. 13 is a perspective view similar to FIG. 9 illustrating the air treatment assembly fully inserted into the expandable air cleaner frame.

An air treatment assembly 214 is illustrated in FIG. 12 in the process of being inserted into the expandable air cleaner frame 200, and in FIG. 13 fully installed in the expandable air cleaner frame 200. The air treatment assembly 214 shares many features of the previously-described air treatment assemblies, including a frame 216 holding an air treatment medium 22 through a keyed connection, as previously described. The frame 216 shares the same features as the frames previously described herein, with the addition of guideposts 218 extending outwardly from the top and bottom rails of the frame 216 for cooperative registry with the slot guides 210 of the expandable air cleaner frame 200. The air treatment assembly 214 can comprise one of the keyed connections 36 illustrated in FIGS. 1-6, and can incorporate the air quality module illustrated in FIG. 7A.

Figure 14:
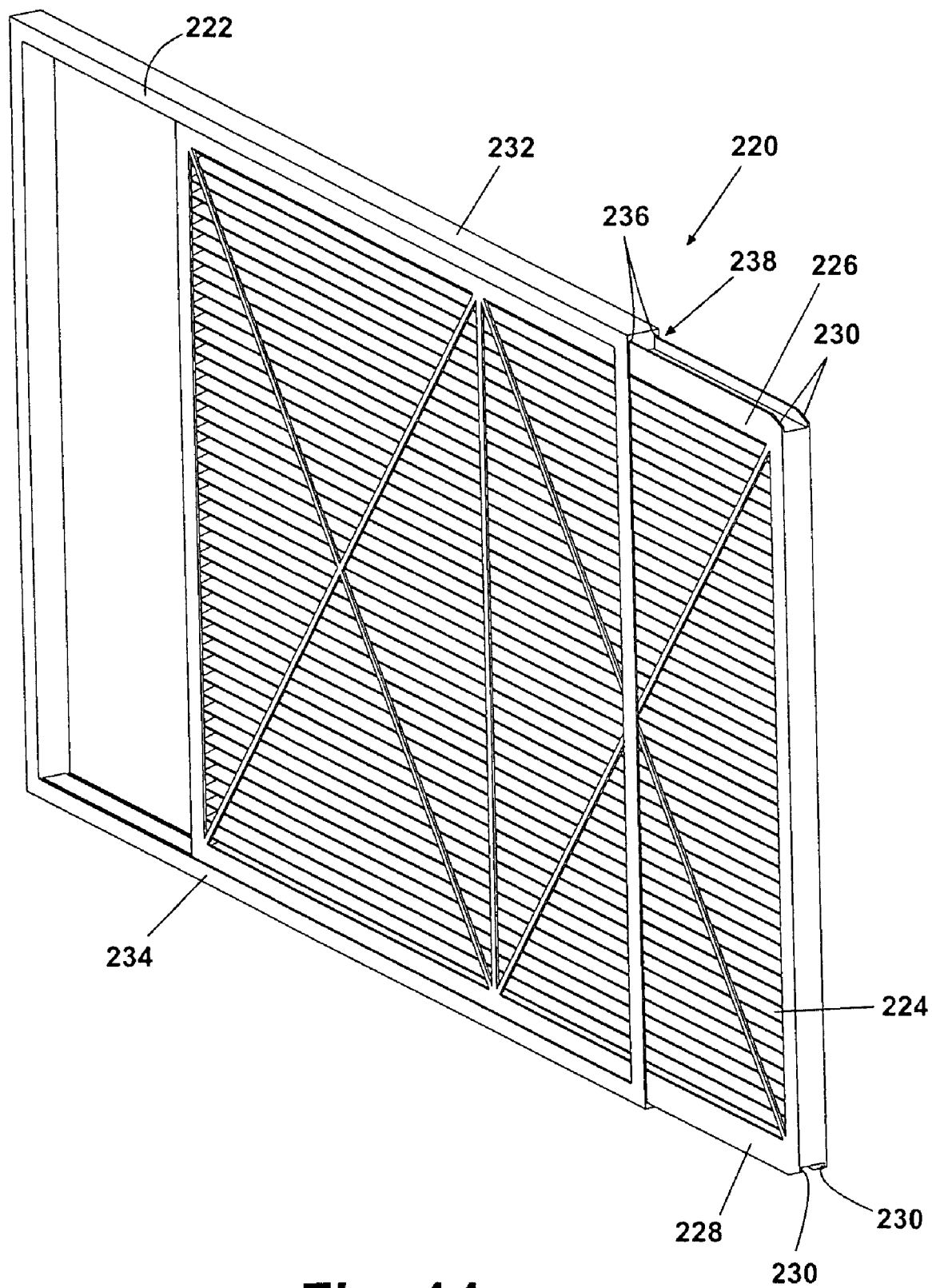
FIG. 14 is a perspective view of an alternate embodiment of a modular air treatment assembly comprising a frame and an air treatment medium having a keyed connection with the frame.
Figure 14A:
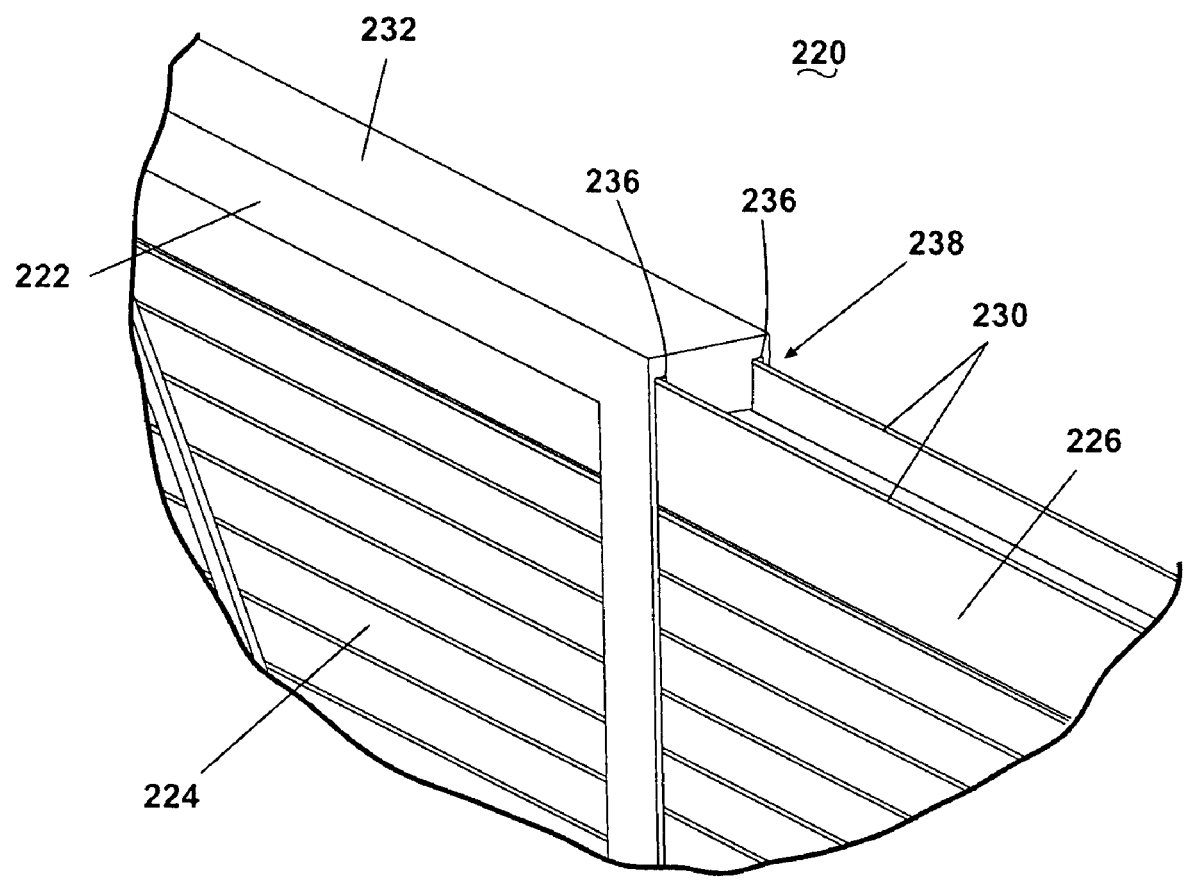
FIG. 14A is an enlarged view of a portion of the modular air treatment assembly of FIG. 14 illustrating the keyed connection of the air treatment medium with the frame.

FIGS. 14 and 14A illustrate an alternate embodiment of an air treatment assembly 220 comprising a frame 222 and an air treatment medium 224 assembled through a keyed connection 238. The air treatment medium 224 shares many features of the air treatment media previously described herein, and comprises an upper rail 226 and a lower rail 228, each having a pair of parallel, longitudinal flanges 230 extending away from the rail 226, 228. The frame 222 comprises an upper rail 232 and a lower rail 234, each provided with a pair of parallel, longitudinal slots 236 extending inwardly and adapted for slidable receipt of the flanges 230. The flanges 230 can be adapted to comprise a key and the slots 236 can be adapted to comprise a keyway complementary to the flanges 230 to form the keyed connection 238. The flanges 230 and the slots 236 can thus be adapted so that a specific air treatment assembly 220 can be paired with a specific frame 222.

It is anticipated that the frame 222 it will be fabricated of a suitable rigid material, which can include cardboard or plastic, which are common frame materials for traditional air filters. It is also anticipated that the air treatment medium 224 will be similar to a conventional disposable air filter element having a cardboard frame, with the flanges 230 fabricated of cardboard integral with the rails 226, 228. Alternately, the air treatment medium 224 can be a reusable element having rails 226, 228 and flanges 230 formed of, for example, a high-strength plastic.

The air filter assembly described herein facilitates the selection and proper installation of an air filter in a HVAC air duct. The keyed connection between the frame and the air treatment medium ensures that only air treatment media appropriate for a particular HVAC system are used, thereby ensuring optimal performance of the air filter assembly.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. An air treatment assembly for treating air passing through an air duct, the air treatment assembly adapted for installation in the air duct and comprising:
   a frame defining an interior space and an inlet opening providing access to the interior space, and having one of a keyway and a key; and
   an air treatment medium adapted to be inserted into the interior space through the inlet opening, and having the other of the keyway and the key;
   wherein the key comprises an extension of one of the frame and the air treatment medium, the key having a selected configuration, and the keyway comprising a seat having a configuration complementary to the configuration of the key for coupling of the key with the keyway, the key coupled with the keyway defining a keyed connection;
   wherein the keyed connection enables the air treatment medium to be constrained in the frame solely in a single preselected orientation.

2. The air treatment assembly according to claim 1, wherein the keyed connection is provided between the inlet opening and the air treatment medium to control the insert orientation of the air treatment medium into the insert opening.

3. The air treatment assembly according to claim 2, wherein each of the air treatment medium and the inlet opening have an irregular cross-section to form the key and keyway.

4. The air treatment assembly according to claim 3, wherein the irregular cross-sections are complementary.

5. The air treatment assembly according to claim 1, wherein the frame is sized to be slidably inserted into a standardized opening in the air duct.

6. The air treatment assembly according to claim 5, wherein the air treatment medium has opposing faces and the keyed connection controls the orientation of the opposing faces relative to the direction of air flow in the duct.

7. The air treatment assembly according to claim 1, wherein the air treatment medium comprises at least one of: an air filter, an ionizer, and an electrostatic precipitator.

8. The air treatment assembly according to claim 1, and further comprising an air quality module removably mounted to the frame.

9. The air treatment assembly according to claim 8, wherein the air quality module is removably mounted to the frame independent of the air treatment medium.

10. The air treatment assembly according to claim 1, wherein the keyed connection is provided between the inlet opening and the air treatment medium to control the size of the air treatment medium relative to the inlet opening.

11. The air treatment assembly according to claim 1, wherein the extension comprises one of a flange, a beveled surface, and a post.

12. The air treatment assembly according to claim 1, wherein the seat comprises one of a rabbet, a beveled surface, and an aperture.

13. An air treatment assembly for treating air passing through an air duct, the air treatment assembly comprising:
   a frame defining an interior space divided into a first section and a second section;

an air treatment medium for treating air, and associated with the first section; and an air quality module for providing air treatment supplemental to that provided by the air treatment medium, adapted to be removably coupled with the second section independently of the state of the air treatment medium relative to the first section.

14. The air treatment assembly according to claim 13, wherein the air quality module comprises an air scent release module.

15. The air treatment assembly according to claim 13, wherein the air quality module comprises a temperature sensing module.

16. The air treatment assembly according to claim 13, wherein the air quality module comprises a humidity sensing module.

17. The air treatment assembly according to claim 13, wherein the air quality module comprises an air pressure transducer.

18. The air treatment assembly according to claim 13, wherein the air quality module comprises a power distribution module.

19. The air treatment assembly according to claim 13, wherein the frame has an inlet opening providing access to at least the first section of the interior space and the air treatment medium is sized to be inserted through the inlet opening.

20. The air treatment assembly according to claim 13, and further comprising a keyed connection between the frame and the air treatment medium to constrain the air treatment medium in the frame solely in one direction relative to the direction of air passage.

21. The air treatment assembly according to claim 13, wherein the frame is sized to be slidably inserted into a standardized opening in the air duct.

22. An air treatment assembly for treating air flowing through an air duct, the air treatment assembly comprising:

a frame defining an interior space, having a first frame member and an insert opening through the first frame member to provide access to the interior space, the frame being insertable into the air duct solely in a preselected orientation;

an air treatment medium having an upstream face toward which air flows and a downstream face away from which air flows, and adapted to be received within the interior space through the insert opening solely in a preselected orientation; and a keyed connection comprising a key and a keyway configured so that coupling of the air treatment medium with the frame constrains the air treatment medium in the frame when the frame is inserted into the air duct so that the upstream face is oriented in an upstream direction relative to the direction of air flow.

* * * * *